July 6, 1943.  F. M. MacDOUGALL  2,323,480
VALVE CONTROL
Filed Feb. 28, 1941
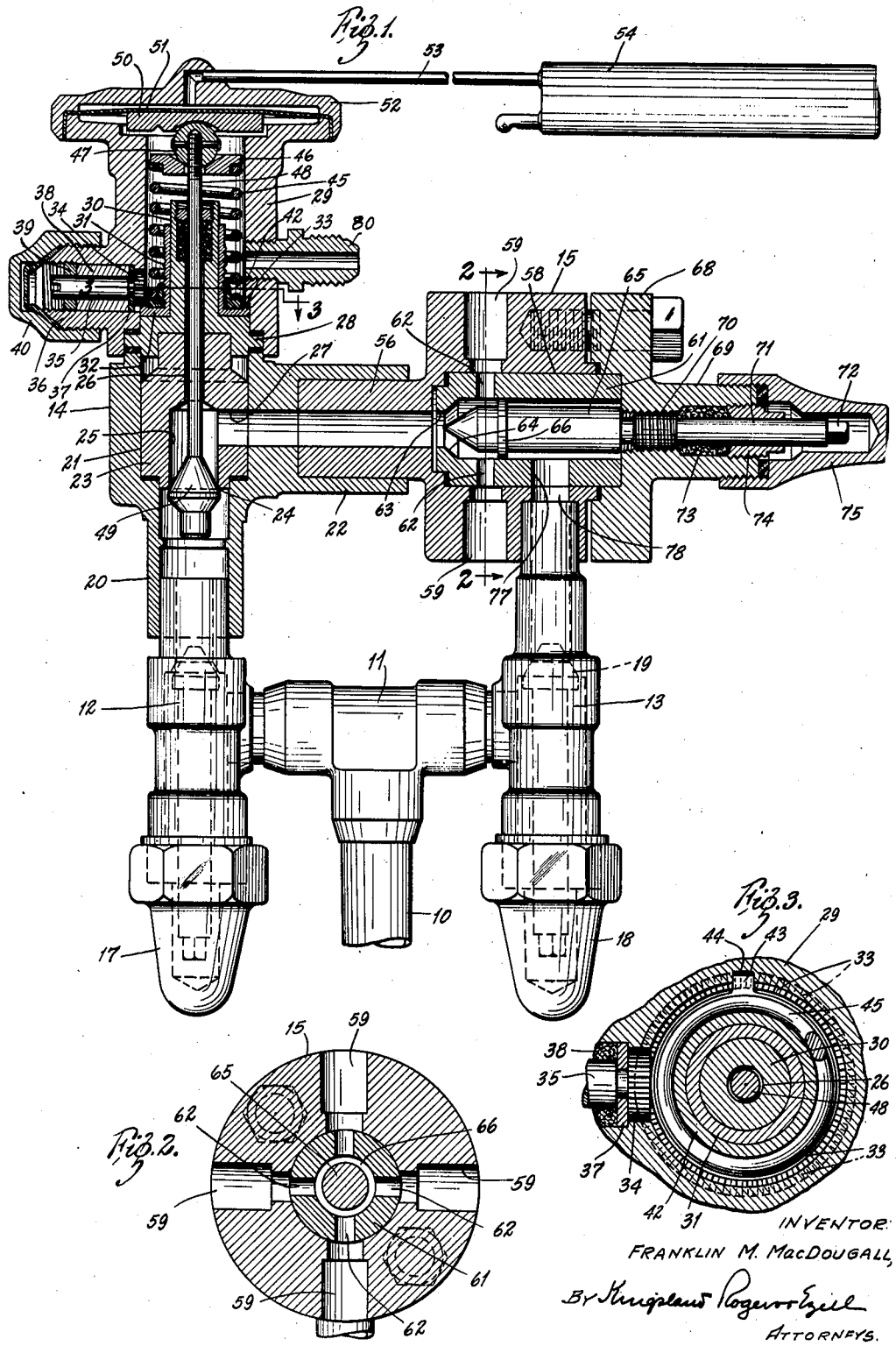
INVENTOR
FRANKLIN M. MacDOUGALL,
By Kingsland Rogers & Ezell
ATTORNEYS.

Patented July 6, 1943

2,323,480

UNITED STATES PATENT OFFICE 2,323,480

VALVE CONTROL

Franklin M. MacDougall, Royal Oak, Mo., assignor to Alco Valve Company, Maplewood, Mo., a corporation of Missouri Application February 28, 1941, Serial No. 380,983

6 Claims. (Cl. 62—8)

The present invention relates to a valved control with particular reference to a valve distributing the medium flowing through it to a plurality of places.

The apparatus consists of a heat control expansion valve such as is used in refrigerating systems, with a distributor annexed thereto adapted to distribute the fluid from the valve into multi-circuit evaporator coils, together with certain additional valves employable as an alternate means for accomplishing at least some of the functions of the previously mentioned structure, and with a selector valve in the distributor controlling which set of valves can transmit the fluid through the distributor.

An object of the invention is to provide an expansion valve and a distributor with an additional set of valves that may be alternately used in the event it is necessary to service the first set of valves.

It is a particular object to do this with a single distributor and particularly with a distributor that may be located in close proximity to the expansion valve. In this connection, it is to be observed that where a high velocity is maintained through the expansion valve, the distribution to a plurality of coils may be uniform if the distributor is located close enough to the expansion valve so that the velocity is not greatly diminished. Hence, the present structure seeks to obtain a reasonably close proximity of the distributor to the expansion valve itself and, at the same time, to provide the alternate valves to permit servicing of the main valve.

Further objects are to provide structures of the kind described that are compact and may be simply operated.

In the drawing:

Fig. 1 is an elevation, partly in section, of the structure;

Fig. 2 is a vertical section through the distributor taken on the line 2—2 of Fig. 1; and, Fig. 3 is a horizontal section taken on the line 3—3 of Fig. 1.

Basically, the mechanism includes an inlet 10 having a T-connection 11 leading on the one hand to a cut-off valve 12 and on the other hand to an expansion valve 13. The cut-off valve 12 in turn leads to a thermally controlled expansion valve 14, and that in turn leads to a distributor 15, which also is connected to the alternate valve 13.

The cut-off valve 12 is not shown in detail because it may assume one of the familiar forms of cut-off valves. It has a seal cap 17 over an adjusting head on the valve stem, by means of which head the valve itself may be caused to seat or unseat, as the case may be, and thereby to cut off or to permit flow of gas from the inlet 10 to the expansion valve 14.

The expansion valve 13 is of the manual type. It is not described in detail because it also may assume one of the known forms. It has a seal cap 18 covering an adjusting means by which the degree of opening of the valve member 19 may be adjusted.

Connected by any suitable means with the outlet of the cut-off valve 12 is the inlet 20 of the thermally controlled expansion valve 14. The valve 14 has a cylindrical bore 21 therein communicating with the inlet, and also with an outlet 22 by which it is connected with the distributor 15.

A hollow valve seat block 23 fits snugly within the bore 21. This valve block has a valve seat 24 formed by the edges of a bore 25 aligned with the inlet 20, the upper end of which is reduced in size as at 26. There is also a counterbore 27 forming a part of the outlet of the valve.

The valve block 23 has a head member 28 fitted over it and clamped between it and the cap 29 by suitable clamping means (not shown) such as screws. The joints are duly sealed by a suitable packing or washers. The head member 28 has an upstanding projection 30 having a bore therein that is a continuation of the reduced bore 26 in the valve block member 23.

An externally threaded sleeve 31 fits closely but rotatably about the upstanding portion 30. This sleeve has a flange 32 at its lower end, the outer edge of which has upstanding gear teeth 33 (Fig. 3) thereon. These gear teeth mesh with a gear 34 on a short shaft 35 within a boss 36 extending from the valve cap 29. A washer 37 is secured to the inner end of the shaft 35 and packing 38 between this washer 37 and a threaded cap 39 maintains the shaft 35 in its innermost position wherein the gear 34 may mesh with the teeth 33. As is shown, a cap 39 is threaded into internal threads within the boss 36, this cap and the washer 37 maintaining the shaft 35 centered. The shaft 35 is kerfed to receive a screw driver. A protecting cap 40 fits over the outer end of the boss.

As noted, the sleeve 31 is externally threaded and receives an internally threaded washer 42 that has a projection or key 43 (Fig. 3) engaging in a broached slot 44 in the valve cap member 29. The washer 42 is, therefore, axially but not rotatably displaceable within the cap member; and rotation of the shaft 35 with the gear 34 will rotate the sleeve member 31 to raise or to lower the washer 42.

This washer receives one end of a coil spring 45, the other end of which engages an additional washer 46 that, by the spring, is forced against a spherical self-centering device 47 attached to the upper end of a valve stem 48. The spring thus forces the valve stem upwardly. The valve stem in turn has on its lower end the expansion valve 49 adapted to seat on the valve seat 24.

The self-centering device 47 acts against a buffer plate 50 that in turn is pressed against a diaphragm 51 sealed across the top of the valve cap member 29 by a closure plate 52. A capillary tube 53 communicates with the chamber above the diaphragm 51 and with a bulb 54.

The outlet 22 of the expansion valve is secured to an inlet 56 of the distributor 15. This distributor has a central bore 58 therein from which radiate a plurality of outlets 59. These outlets are adapted to be connected each to a suitable multi-circuit evaporator.

Within the center bore 58 there is a cylindrical sleeve member 61 having a plurality of ports 62 registering with the several ports 59. This cylindrical sleeve member 61 has a port 63 in registry with the inlet port to the distributor member from the expansion valve. Between this port and the distributing ports 62 is a valve seat 64 adapted to receive a cut-off valve 65. The valve 65 has a centering flange 66 engaging against the inner walls of the cylindrical member. A cap member 68 clamps the cylindrical member 61 within the body portion. The member 68 likewise has a projecting boss 69 that is internally threaded to receive a correspondingly threaded portion 70 on a stem 71 of the valve 65. The stem 71 projects through the end of the boss 69 and may be engaged on its squared head 72 by a suitable wrench. Packing 73 and a plug 74 threaded against the packing seal the inside of the distributor 15. A seal cap 75 is fitted over the end 72 of the valve.

A port 77 through the wall of the member 61 registers with an alternate inlet port 78 that is connected with the outlet of the alternate expansion valve 13.

The operation of the structure is as follows:

When fluid from the compressor under pressure passes from the inlet 10 into the T 11, it flows to both the valve 12 and the valve 13. Assuming the valve 12 open and the valve 13 closed, no flow can take place through the latter, but flow will take place through the former up to the expansion valve 49. Whenever the temperature at the bulb 54 is sufficiently high so that the fluid within the bulb causes an expansion of the diaphragm chamber, the diaphragm will be displaced, forcing the valve 49 to open, as will be understood. This action takes place against the tension of the spring 45, and the pressure under the diaphragm, the latter being pressure of the evaporator admitted through the inlet connection 80, which tension is adjusted by displacement of the washer 42 upwardly or downwardly on the sleeve 31 by means of rotation of the shaft 35.

The fluid flowing around the expansion valve 49 expands and passes through the port 27 and ultimately into the distributor 15. Preferably, the volume between the point of expansion and the point of distribution is held to a minimum. Assuming the distributor to be in the position shown, the valve 65 will be open. Hence, the fluid will flow out through the several ports 62 and 59 into the respective expansion coils of the multi-circuit evaporator.

Should it be desired to service the thermal valve 14, the cut-off valve 12 is closed. The selector valve 65 is then displaced inwardly until the valve 65 seats against the seat 64. In this position, there can be no leakage between the ports 62 and the inlet 56. Then the manual expansion valve 13 is opened and adjusted to provide the proper flow of fluid therethrough. Thereupon, fluid from the inlet 10 flows through the expansion valve 13 (being blocked by the valve 12) and ultimately through the distributor to the ports 62 and 59. Therefore, the operation of the refrigerating mechanism may continue, with the cessation and the thermal valve member serviced as desired.

From the foregoing, it will be seen that there has here been provided a very compact and readily operated change-over mechanism to continue operation of a refrigerating system, but yet to permit servicing of the main expansion valve.

What is claimed is:

1. In a system of the kind described, a distributor having a plurality of outlets, a pair of inlets, both adapted to lead to said outlets, means selectively to connect either inlet with the outlets, a pair of expansion valves, one connected to each distributor inlet, a main inlet connected with both expansion valves, and means to cut off one expansion valve from the main inlet, so that upon connection of the distributor inlet to the other expansion valve, the first expansion valve may be withdrawn without cessation of flow through the system.

2. In a system of the kind described, a distributor having a plurality of outlets, and a pair of inlets both adapted to communicate with said outlets, means selectively to connect one inlet with the outlets, and to cut off the other inlet, a thermally-controlled expansion valve connected with one inlet, a manually operated expansion valve connected with the other inlet, a main inlet connected with both expansion valves, and a manual cut-off valve between the main inlet and the thermally-controlled expansion valve.

3. In a system of the kind described, a distributor having a plurality of outlets, and a pair of inlets both communicating with said outlets, an automatic valve connected to one inlet, a second valve connected to the other inlet, means selectively to connect either inlet with the outlets, and at the same time to cut the other inlet off from the outlets, a main inlet communicating with both valves, and a valve between the main inlet and the automatic valve adapted to block communication therebetween, and, when the connecting means is operated to select the other distributor inlet, to prevent all communication to the automatic valve to enable servicing thereof.

4. In a system of the kind described, a distributor having a body, a plurality of outlet ports in the body, a pair of inlet ports in the body, each adapted to communicate with the outlet ports, and a valve in the body adapted to close one inlet.

5. In a mechanism of the kind described, a valve device having a plurality of radially disposed outlets, a pair of spaced inlets, and a hollow central chamber into which said inlets and outlets communicate, a valve operating therein, and means to cause said valve to close one of said inlets, said valve being displaceable from the closing position to a position wherein at least one inlet has free communication with the outlets.

6. In a mechanism of the kind described, a valve device having a body member with a hollow chamber therein, a plurality of radial outlets leading from the chamber, a pair of inlets into said chamber, one at each side of said group of outlets, a valve member in said chamber adapted to close one of said inlets, and means accessible outside the body to operate the valve member.

FRANKLIN M. MacDOUGALL.